United States Patent [19]
Ovcharenko et al.

[11] 3,829,028
[45] Aug. 13, 1974

[54] METHOD FOR THE ACTIVATION OF LOOSE INGREDIENTS OF ELASTOMER MIXES

[76] Inventors: Fedor Danilovich Ovcharenko, ulitsa Kirova, 9, kv. 35; Alexei Dmitrievich Chugai, ulitsa Gvardeiskaya, 21, both of Kiev; Karl Lazarevich Tsantker, ulitsa Gogdya, 19, kv. 4, Poltava; Dmitry Danilovich Logvinenko, ulitsa Kalinina, 5, kv. 5, Poltava; Oleg Parfirovich Shelyakov, ulitsa Kalinina, 5, kv. 100, Poltava; Ljudmila Efimovna Chechik, ulitsa Krasnoarmeiskaya, 58, kv. 2, Kiev; Alla Mikhailovna Belonozhko, ulitsa Frunze, 108, kv. 4, Poltava; Ekaterina Alexandrovna Morozko, ulitsa K.Libknekhta, 22, Poltava; Ljudmila Nikolaevna Kuzmina, ulitsa Almaznaya, 4, kv. 191, Poltava; Nadezhda Vasilievna Vdovenko, ulitsa Kapitonovskaya, 10, kv. 51, Kiev; Nikolai Grigorievich Vasiliev, ulitsa Kapitonovskaya, 6, kv. 8, Kiev; Nina Ivanovna Soloshenko, Prospekt Nauki, 142, korpus 9. kv. 22, Kiev, all of U.S.S.R.

[22] Filed: Jan. 12, 1972

[21] Appl. No.: 217,244

[30] Foreign Application Priority Data
May 17, 1971   U.S.S.R.............................. 1653307

[52] U.S. Cl. ................................................. 241/1
[51] Int. Cl. ............................................ B02c 19/00
[58] Field of Search............................. 241/1, 5, 30

[56] References Cited
UNITED STATES PATENTS

| 2,983,454 | 5/1961 | Podmore, Jr. et al. | 241/30 |
| 3,622,650 | 11/1971 | Berstein | 241/5 |
| 3,691,130 | 9/1972 | Logvinenko | 241/1 X |

*Primary Examiner*—Granville Y. Custer, Jr.
*Attorney, Agent, or Firm*—Holman & Stern

[57] ABSTRACT

A method for the activation of loose ingredients for elastomer mixes which comprises increasing the specific surface area of said ingredients by subjecting loose ingredient particles to the action of ferromagnetic bodies in a running electromagnetic field.

7 Claims, 4 Drawing Figures

METHOD FOR THE ACTIVATION OF LOOSE INGREDIENTS OF ELASTOMER MIXES

This invention relates to methods for the activation of components of rubber mixes and, more particularly, is concerned with methods for the activation of loose components of elastomers intended for use in the rubber, cable and tire industries, as well as in the manufacture of artificial leather, etc.

It is known in the art to activate loose components of elastomers by increasing the specific surface area of said components, e.g., by acting on the particles of loose components with a pressurized water jet.

However, the known method suffers from the drawback of being unsuitable for the preparation of solid-phase activated components of rubber mixes, other limitations of said method being the necessity of employing elaborate equipment for rubber mix component activation and of resorting to high-pressure water jets, which involve excessive power requirements.

An object of the present invention is to provide a method for activating loose components for the preparation of elastomers, which is suitable for obtaining solid-phase activated components, requires no elaborate apparatus and equipment and is adequately efficient.

To the attainment of this end, there is provided a method for activating loose components to be used for the preparation of elastomers wherein, according to the present invention, an increase in the specific surface area of loose components is effected by subjecting the particles of loose components to the action of ferromagnetic bodies in a running electromagnetic field.

It is preferable that the magnetic induction of a running electromagnetic field acting upon the reaction mixture that contains the aforementioned loose materials should be equal to at least 0.08 Tesla.

The method of the present invention is carried out as follows:

A reaction vessel manufactured from a non-magnetic or feebly magnetic material and furnished with inlet and outlet connection pipes is charged with a requisite amount of non-equiaxial ferromagnetic bodies such as, for example, steel, iron or nickel bodies and the like, and also with a mixture of all the loose components of an elastomer mix, including plasticizing and softening agents.

The running electromagnetic field (magnetic induction of 0.08 Tesla minimum) induced, for example, by an appropriate generator causes the ferromagnetic (metallic) bodies to vigorously move according to a complicated pattern involving the rotation of said bodies about their minor axes at a rate close to the speed of electromagnetic field rotation, the translational and oscillatory movement of said bodies, and also magnetostrictive vibrations, the overall result being the formation of a vortex bed constituted by said ferromagnetic bodies.

The moving ferromagnetic particles collide with the particles of loose components contained in the reaction vessel at a rate of thousands of impacts per second, the resulting phenomena of mixing and dispersing of the particles being responsible for a significant increase of the specific surface area of the components and for associated formation of numerous active sites which are conducive to enhancing the reactivity of said components. The thus-activated components are introduced into appropriate rubbers by conventional procedures and the mixes obtained are thereafter processed to obtain the desired vulcanizates.

Where the fibers are activated separately from other loose ingredients of elastomer mixes, it is preferable to charge into the reaction vessel, apart from the ferromagnetic bodies and the filler to be activated, modifying agents in an amount of 5 parts by weight of the modifier per 100 parts by weight of the filler. It is preferred to use long-chain cation surfactants as modifiers, although latices are likewise suitable modifiers.

In this instance, both the filler and modifier undergo thorough dispersion and mixing accompanied by modifier deposition onto the surface of filler particles. The resulting modified filler is incorporated into raw rubber together with other loose ingredients by standard techniques.

The present method makes it possible to obtain solid-phase activated components for elastomer mixes, while the employment of said solid-phase components results in a substantial reduction (generally, a two-fold reduction) of the time required for incorporating the loose components into raw rubber and enhances markedly the strength of rubber products ($\sigma = 230$ kgf/cm$^2$).

The present method is further advantageous in that it provides for a significant simplification of technology for the production of activated components to be used in elastomer mixes and requires no elaborate or expensive equipment for its embodiment.

The present invention will be more easily understood from the following description, taken in conjunction with the accompanying drawings, wherein.

Figure 1:
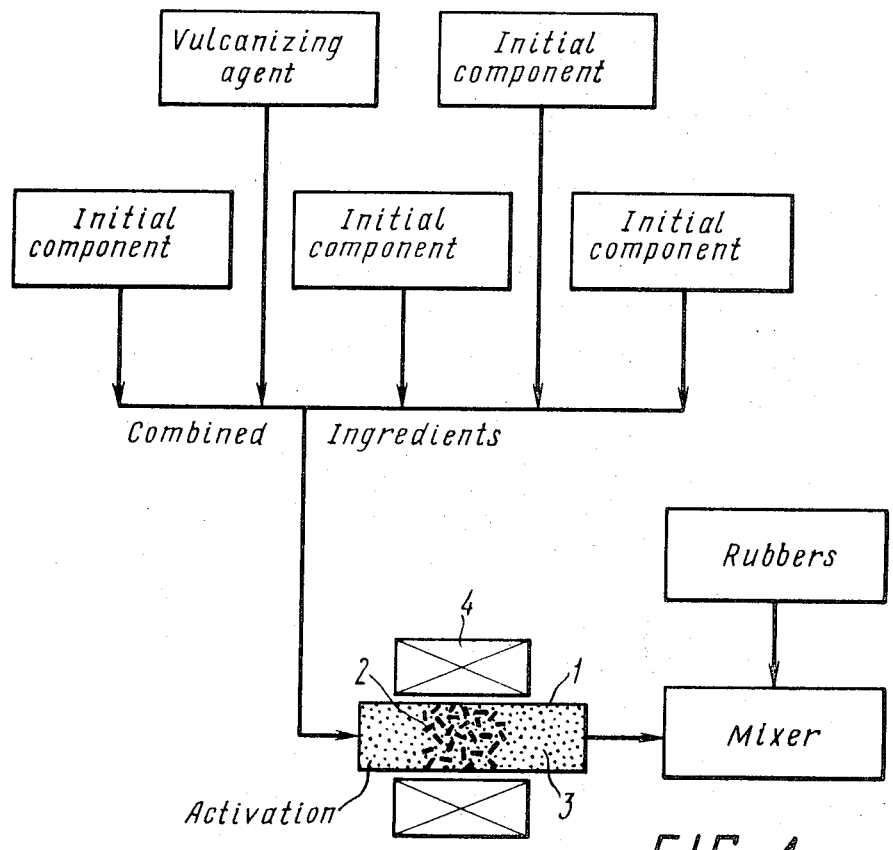
FIG. 1 is a flowsheet which is illustrative of the method of the present invention for activating loose components to be employed in elastomers.
Figure 2:
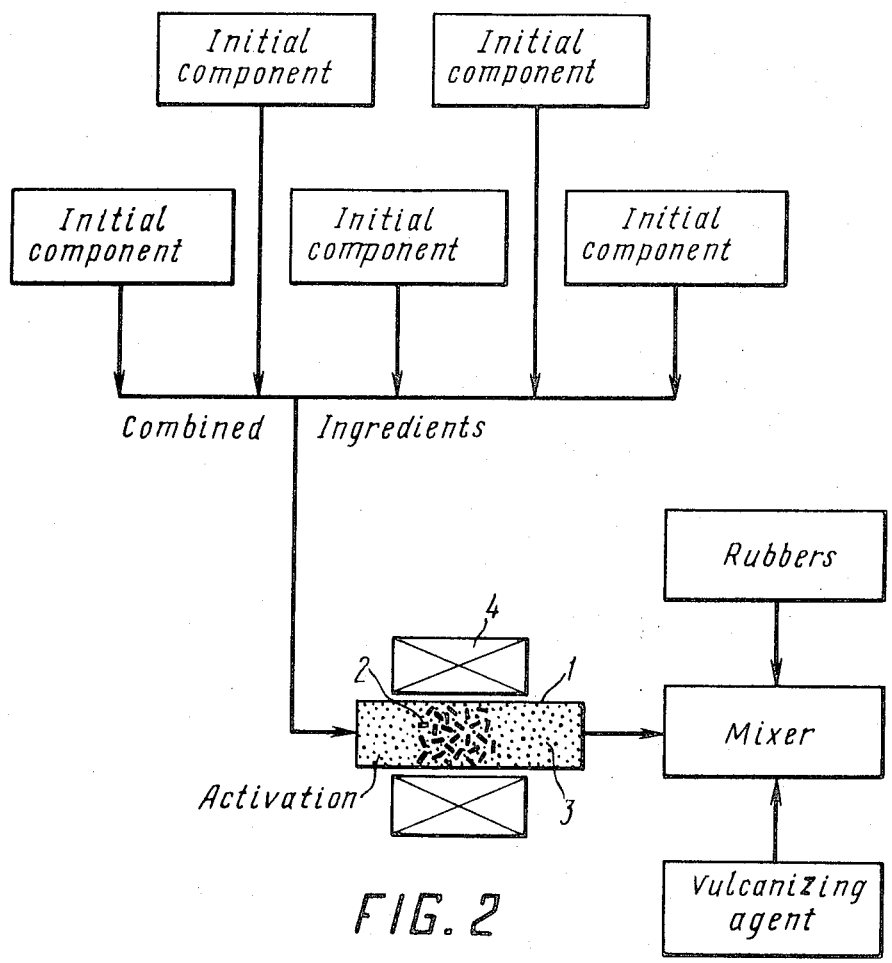
FIG. 2 is a flowsheet similar to that of FIG. 1, wherein the vulcanizing agents are not exposed to the effect of a rotating electromagnetic field.
Figure 3:
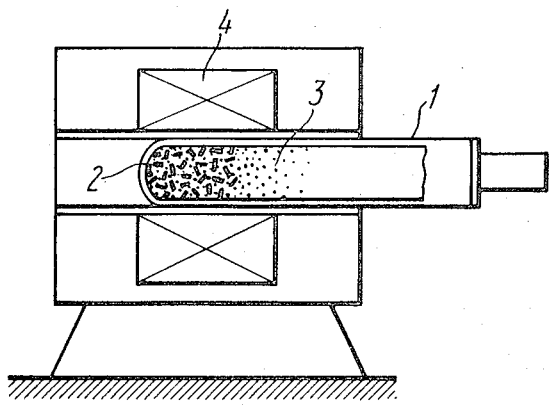
FIG. 3 is a schematic diagram showing the activation of loose components by a batch method.
Figure 4:
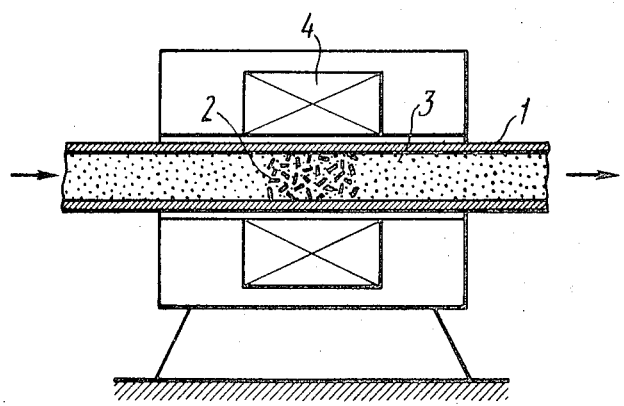
FIG. 4 is a schematic diagram showing the activation of loose components in a continuous method.

Referring to the drawings, FIGS. 1 through 4 show a mixture of loose components 3 loaded, together with plasticizers, into a reaction container 1 made of a non-magnetic or slightly magnetic material, a required amount of non-equiaxial ferromagnetic bodies 2, for example, steel, iron or nickel, having been previously charged into the container 1. The mixture of loose components 3 is subjected to the action of a rotating electromagnetic field 4 whose induction is at least equal to 0.8 Tesla. The thus-activated components are then loaded with raw rubber, for example, into a conventional mixer for further processing into the desired rubber products.

The following examples are given to illustrate the manner in which the present invention may be carried into effect, the activation of loose components for elastomer mixes being conducted in an apparatus in which magnetic induction in the working zone equals 0.15 Tesla and the electromagnetic field rotates at a speed of 3,000 r.p.m.

EXAMPLE 1

A mixture of all the loose ingredients (rubber stock formulae are listed in Table 1) is subjected to pre-mixing and dispersing prior to mixture incorporation into an appropriate raw rubber (method modification I) or the step of pre-mixing and dispersing involves the loose ingredients except the vulcanizing agent, followed by incorporating into an appropriate raw rubber the resulting mixture and the vulcanizing agent sulphur (method modification II). The method modification II is resorted to when processing of all the ingredients results in their chemical interaction, so that appropriate rubber mixes are likely to undergo scorching.

To carry out either the method modifications, the ingredients according to the rubber stock formulae of Table 1 are charged into the reaction vessel that contains ferromagnetic particles. Next the reaction vessel is introduced into the zone of a rotating electromagnetic field generated by a suitable inductor, and dispersing and mixing of the ingredients in a vortex bed of ferromagnetic particles, as well as the simultaneous treatment of the mixture of ingredients by the electromagnetic field induced by the inductor and also by local fields due to each ferromagnetic particle, occur within 1 minute under the electromagnetic field parameters specified previously.

The ferromagnetic particles used are cylindrical in shape (1.2 mm in dia. and 12 mm long) and are manufactured from steel (2%C). To remove the ferromagnetic particles from the processed mixture of ingredients, use is made of electromagnetic separation. The processed mixture of ingredients, in which each particle possesses active sites that accelerate chemical reactions, or a processed mixture and a vulcanizing agent (method modification II), is milled together with an appropriate raw rubber. The specimens of the rubber mixes thus prepared are subjected to conventional strength tests.

The reference specimens of vulcanizates prepared by using non-activated loose components are also tested.

TABLE 1

| Components | Parts by weight | | |
|---|---|---|---|
| | 1 | 2 | 3 |
| 1. Styrene rubber (CKC-30) | 100.00 | — | — |
| 2. Nitrile rubber (CKH-18) | — | 100.00 | — |
| 3. Natural rubber (smoked sheets) | — | — | 100.00 |
| 4. Stearine, commercial grade (c.1) | 2.00 | 1.50 | 0.50 |
| 5. Zinc white | 5.00 | 5.00 | 5.00 |
| 6. Captax | — | 1.50 | 5.00 |
| 7. Altax | 0.60 | — | 0.70 |
| 8. Diphenylguanidine | 0.75 | — | — |
| 9. Channel black (DΓ-100) | 50.00 | 50.00 | — |
| 10. Sulphur | 2.00 | 2.00 | 3.00 |
| 11. Rubrax | 5.00 | — | — |

The results of physical and mechanical tests of vulcanizate specimens indicate that the present method of activating the loose components of elastomer mixes reduces by a factor of 2.5 to 3 the milling time (with styrene or nitrile rubber the milling time for activated ingredients equals 13 minutes as against 40 minutes in case the ingredients are non-activated) and simultaneously improves the physical and mechanical characteristics of the resulting vulcanizates.

EXAMPLE 2

A mixture comprising 160 g of a filler, such as kaolin, and 16.9 of a modifier, e.g., dimethylalkylbenzylammonium chloride (DMBA), is processed in a running electromagnetic field for a period of 10 minutes in the presence of 100 g of ferromagnetic cylinders having the dimensions specified in Example 1, followed by separating the ferromagnetic particles from the processed mixture by the electromagnetic technique.

The resulting activated kaolin is incorporated, together with other loose ingredients, into a styrene rubber mix (see the rubber stock formula in Table 2) by the milling technique.

The vulcanizates thus obtained are subjected to conventional strength tests. Reference specimens obtained by using non-activated kaolin are tested in a similar manner.

TABLE 2

| Components | Parts by weight | | |
|---|---|---|---|
| | 1 | 2 | 3 |
| 1. Styrene rubber (CKC-30 APK π) | 100.00 | 100.00 | 100.00 |
| 2. Kaolin, non-activated | 160.00 | — | — |
| 3. Kaolin modified with DMBA in a vortex bed of ferromagnetic particles | — | 160.00 | — |
| 4. Kaolin modified with DMBA (no vortex bed treatment) | — | — | 160.00 |
| 5. Stearine, commercial grade | 3.00 | 3.00 | 3.00 |
| 6. Altax | 6.00 | 6.00 | 6.00 |
| 7. Zinc oxide | 10.00 | 10.00 | 10.00 |
| 8. Sulphur | 4.00 | 4.00 | 4.00 |

Physical and mechanical tests of the resulting vulcanizates point to the fact that kaolin activation in the presence of DMBA by ferromagnetic particles in a running electromagnetic field brings about a 1.5- to 3.5-fold increase of vulcanizate strength. Thus, the tensile strength ($\theta$) of reference specimens (vulcanization time, 10 min. at 143°C) equals 58 kgf/cm$^2$, whereas the modified activated kaolin-loaded vulcanizates cured under the conditions specified above are characterized by $\sigma = 230$ kgf/cm$^2$.

It will be noted that the employment of modified activated kaolin results in a two- to four- fold diminution of the vulcanization time. The optimum vulcanization time of reference specimens equals 40 to 60 minutes, while for modified activated kaolin-loaded rubber stock the superior strength characteristics are obtained when the vulcanization time is 5–10 min.

An additional reference specimen is prepared from a rubber mix loaded with kaolin modified with the same modifying agent (DMBA), but not treated by ferromagnetic particles in a vortex bed induced by a running electromagnetic field. The maximum tensile strength of vulcanizates filled with said modified kaolin equals 160 kgf/cm$^2$. However, said method of activation is inferior to the present method in that it is effected in an aqueous medium at elevated temperatures, followed by centrifuging, drying and comminuting steps, and hence, presents technological difficulties and involves high power requirements.

EXAMPLE 3

A mixture consisting of 160 g of chalk (the filler to be used in conjunction with other loose ingredients for preparing elastomer mixes) and 16.9 g of a modifier (DMBA) is placed in the zone of rotating electromagnetic field action in the presence of 100 g of steel ferromagnetic bodies of the shape specified in Example 1, the duration of chalk processing being 10 minutes.

After separating the ferromagnetic particles, the modified activated chalk is incorporated together with other ingredients (see the rubber stock formula in Table 3) into a styrene rubber mix by the milling technique with a view to obtaining a skim stock for oil-cloth manufacture. Reference specimens are prepared from a mix containing non-modified chalk.

TABLE 3

| Components | Parts by weight | |
|---|---|---|
| | 1 | 2 |
| 1. Styrene rubber (CKC-30 APK π) | 200.00 | 200.00 |
| 2. Sulphur | 7.00 | 7.00 |
| 3. Captax | 3.20 | 3.20 |
| 4. Thiuram | 1.00 | 1.00 |
| 5. Zinc oxide | 10.00 | 10.00 |
| 6. Stearine, commercial grade | 7.60 | 7.60 |
| 7. Lithopone | 60.00 | 60.00 |
| 8. Chalk, non-activated | 300.00 | — |
| 9. Chalk modified with DMBA in a vortex bed of ferromagnetic particles | — | 300.00 |
| 10. Vaseline oil | 40.00 | 40.00 |
| 11. Orange pigment | 1.00 | 1.00 |

The results of physical and mechanical tests of the thus-obtained vulcanizates show that chalk modification with DMBA in a vortex bed of ferromagnetic particles results in increasing the strength characteristics of said vulcanizates by a factor of from 2.5 to 3 (the reference specimens after a 30 minute period of vulcanization at 143°C are characterized by a tensile strength of 14 kgf/cm$^2$, whereas the modified chalk-filled vulcanizate after vulcanization at 143°C for a period of 5 minutes acquire a tensile strength of 36 kgf/cm$^2$), an added advantage being a six-fold reduction of the optimum vulcanization period.

EXAMPLE 4

A mixture consisting of 160 g of a filler, such as kaolin, and 0.75 g of chloroprene latex (Nairit, Type λ-7, calculation dry matter basis) is placed in the zone of a running electromagnetic field for a period of 10 minutes in the presence of 100 g of steel ferromagnetic particles. The resulting modified kaolin is separated from the ferromagnetic particles, dried in a drying cabinet at 70°C for a period of one hour and thereafter milled with a natural rubber-styrene rubber (Type CKC-30 APK π) blend to obtain a rubber mix intended for the production of rubber foot-wear.

Reference specimens are prepared from non-activated kaolin-filled vulcanizates. Table 4 lists the rubber stock formulae used.

TABLE 4

| Components | Parts by weight | |
|---|---|---|
| | 1 | 2 |
| 1. Natural rubber (smoked sheets) | 50.00 | 50.00 |
| 2. Styrene rubber (CKC-30 APK π) | 50.00 | 50.00 |
| 3. Captax | 2.00 | 2.00 |
| 4. Thiuram | 0.10 | 0.10 |
| 5. Zinc white | 5.00 | 5.00 |
| 6. Kaolin, non-activated | 40.00 | — |
| 7. Kaolin modified with a latex in a vortex bed of ferromagnetic particles | — | 40.00 |
| 8. Chalk | 50.00 | 50.00 |
| 9. Antiageing agent, Type π-23 | 2.00 | 2.00 |
| 10. Vaseline oil | 12.00 | 12.00 |
| 11. Sulphur | 2.00 | 2.00 |
| 12. Orange lake | 2.00 | 2.00 |

Physical and mechanical tests of the vulcanizates thus obtained are indicative of the fact that kaolin activated with chloroprene latex (Type λ-7 Nairit) in a vortex bed of ferromagnetic particles under the effect of a running electromagnetic field provides for a 20–40 percent increase in the strength characteristics of activated kaolin-filled vulcanizates, all other properties being practically unaltered.

EXAMPLE 5

One hundred sixty g of a filler, such as thermal black (a loose ingredient for use in elastomer mixes) is charged into a reaction vessel containing 100 g of steel ferromagnetic particles of the size and shape specified in the preceding examples and subjected to the effects of a running electromagnetic field for a period of 5 minutes.

On completion of activation, the ferromagnetic particles are recovered by the electromagnetic separation technique, and the activated black is milled together with other loose ingredients and Type CKC-30 APK-M-15 styrene rubber to obtain the rubber stock formula specified in Table 5 and intended for the production of textile-and-rubber goods.

TABLE 5

| Components | Parts by weight | |
|---|---|---|
| | 1 | 2 |
| 1. Styrene rubber (CKC-30 APKM-15) | 100.00 | 100.00 |
| 2. Sulphur | 0.46 | 0.46 |
| 3. Altax | 2.15 | 2.15 |
| 4. Thiuram | 0.92 | 0.92 |
| 5. Zinc oxide | 1.54 | 1.54 |
| 6. Softener | 3.38 | 3.38 |
| 7. Vaseline oil | 36.16 | 36.16 |
| 8. Thermal black, non-activated | 101.54 | — |
| 9. Thermal black activated in a vortex bed of ferromagnetic particles | — | 101.54 |
| 10. Kaolin | 33.85 | 33.85 |
| 11. Chalk | 27.69 | 27.69 |

Conventional physical and mechanical tests of the thus-prepared vulcanizates show that the use of the thermal black activated by ferromagnetic particles in a running electromagnetic field results in a 20–30 percent increase of strength characteristics of textile-and-rubber goods, all other properties remaining unaltered. Thus the tensile strength of reference specimens subjected to vulcanization for a period of 40 minutes at 143°C equals 95 kgf/cm$^2$, while the tensile strength of activated black-loaded vulcanizates (10 minutes vulcanization at 143°C) is as high as 132 kgf/cm$^2$.

EXAMPLE 6

Into a reaction vessel are charged 160 g of kaolin as a loose ingredient of elastomer mixes and 100 g of ferromagnetic particles (steel) 12 mm long and 1.2 mm in diameter, followed by subjecting said mixture to the effects of a running electromagnetic field for a period of 10 min.

The activated kaolin prepared as described hereinabove is milled with other loose ingredients and styrene rubber to obtain rubber stock formulae listed in Table 6. The activated kaolin-loaded vulcanizates and reference specimens prepared by using a non-activated filler are subjected to conventional tests.

TABLE 6

| Components | Parts by weights | |
|---|---|---|
| | 1. | 2 |
| 1. Styrene rubber (CKC-30 APK π) | 100.00 | 100.00 |
| 2. Kaolin, non-activated | 160.00 | — |
| 3. Kaolin activated in a vortex bed of ferromagnetic particles | — | 160.00 |
| 4. Stearine, commercial grade | 3.00 | 3.00 |
| 5. Altax | 6.00 | 6.00 |
| 6. Zinc oxide | 10.00 | 10.00 |
| 7. Sulphur | 4.00 | 4.00 |

The results of physical and mechanical tests show that the activation of kaolin with ferromagnetic particles in a running electromagnetic field results in increasing by 20–30 percent the strength characteristics of the activated kaolin-loaded vulcanizates as compared to the vulcanizates loaded with conventional, non-activated kaolin.

We claim:

1. A method for the activation of loose ingredients, including filler, to be used for the preparation of elastomer mixes, by increasing the specific surface area of said ingredients, which comprises subjecting the particles of loose ingredients to the action of ferromagnetic bodies in a rotating electromagnetic field.

2. A method as of claim 1, wherein the induction of said electromagnetic field equals at least 0.08 Tesla.

3. The method of claim 1, further including the steps of separating the ferromagnetic bodies from the loose ingredients and milling the loose ingredients together with a rubber material.

4. The method of claim 1 wherein the ferromagnetic bodies are cylindrical in shape.

5. The method of claim 1 wherein the filler component of the loose ingredients is selected from the group consisting of kaolin and chalk.

6. The method of claim 1 wherein the ferromagnetic bodies are made of a material selected from the group consisting of steel, iron and nickel.

7. The method of claim 1 wherein there is initially added to the loose ingredients prior to treatment in the rotating electromagnetic field, a modifying agent in the form of a cation surfactant.

* * * * *